Aug. 7, 1945.  C. P. STEWART  2,381,087

CHUCK ATTACHMENT

Filed April 18, 1944

CHARLES P. STEWART,
INVENTOR.

BY Hazard & Miller

ATTORNEY.

Patented Aug. 7, 1945

2,381,087

UNITED STATES PATENT OFFICE 2,381,087

CHUCK ATTACHMENT

Charles P. Stewart, Los Angeles, Calif.

Application April 18, 1944, Serial No. 531,543

6 Claims. (Cl. 77—55)

This invention relates to an attachment for chucks adapted to hold and rotate drills.

There are many instances, such as in the course of airplane construction where a multiplicity of small holes must be drilled through sheet metal parts for the reception of rivets, bolts, or other fastening devices. Under these circumstances the actual depth of the hole is relatively small, being only the thickness of the sheet metal part. Usually such holes are drilled by means of air driven or otherwise portable drills and considerable difficulty has heretofore been experienced in connection with drill breakage. The conventional drill supplied for this purpose is relatively long as compared with its diameter and unless the operator of the hand drill is quite careful lateral or bending stresses are applied to the drill during the drilling causing the drills to break.

An object of the present invention is to provide an attachment for chucks such as are employed on air driven or otherwise portable drills which will effectively brace the shank of the drill so that only the required length of the drill that is necessary to drill completely through the sheet metal is left projecting. With such a short length of drill shank projecting beyond the brace or bushing that encircles the drill breakage of drills is greatly reduced inasmuch as these short projecting unsupported ends of the drills are capable of withstanding ordinary lateral forces.

Another object of the invention is to provide an attachment for chucks consisting of a body attachable to a chuck and having adjustable therein a counterbored bushing through which the drill may extend. By means of the adjustment the bushing may be advanced or retracted to leave the desired length of drill projecting therefrom and as the drill shortens due to successive resharpenings the bushing may be retracted so as to leave only the desired length of unsupported drill projecting therefrom. By means of the counterbore which is capable of receiving the chuck jaws a very compact, sturdy construction is possible.

Another object of the invention is to provide a chuck attachment having the above-mentioned characteristics wherein provision is made for protecting the sheet metal when the drill completes the drilling of the hole so that chuck attachment will not scar or otherwise injure the sheet metal being drilled.

Another object of the invention is to provide a chuck attachment applicable to a conventional Jacob's chuck which utilizes apertures or recesses already formed on the chuck body for attaching the attachment to the chuck and which is so constructed that the attachment does not interfere with normal tightening and loosening operations of the chuck which may be required whenever a drill has become dulled or it is necessary to change the size of the drill.

With the foregoing and other objects in view, which will be made manifest in the following detailed description and specifically pointed out in the appended claims, reference is had to the accompanying drawing for an illustrative embodiment of the invention, wherein:

Figure 1:
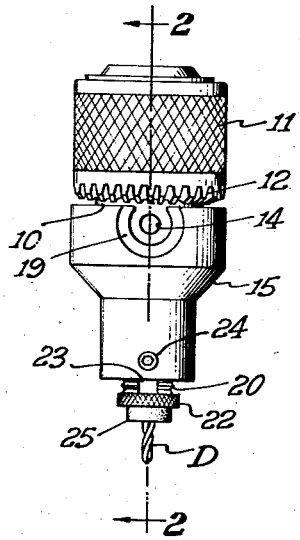
Figure 1 is a view in side elevation of the conventional Jacob's chuck illustrating the attachment embodying the present invention as having been applied thereto.

Referring to the accompanying drawing wherein similar reference characters designate similar parts throughout, 10 indicates the body of a conventional Jacob's chuck on which is rotatable a collar 11 having beveled teeth 12 by which the collar may be rotated relatively to the body 10 by means of a pinion key, not shown, to open or close the jaws 13 that are designed to be tightened around the drill D. The body 10 may be attached in any suitable manner to the spindle of an air driven or otherwise portable drill. Frequently the body 10 has its upper end internally threaded for attachment to the spindle. Below the teeth 12 the body 10 is usually equipped with three circumferentially spaced apertures or recesses any of which may receive the short cylindrical shank on the pinion. Such apertures are indicated at 14.

The attachment embodying the present invention comprises a tubular body 15, the upper end of which is enlarged so as to be telescopically receivable over the lower portion of the body 10. In this upper enlarged portion there are two threaded holes 16 and 17 arranged opposite two of the holes or recesses 14, thus serving to fasten the body 15 onto the body 10 of the chuck so that it will rotate with the chuck. Opposite the threaded recess or aperture 14 the enlarged upper portion of body 15 is formed with an opening 19 which exposes the third aperture or recess to permit the insertion or application of the pinion key in the conventional manner to rotate the collar 11. The lower portion of the body 15 is internally threaded to receive a bushing 20 having an axial bore 21 therethrough through which the drill D extends. This bore is of such a size as to fit somewhat snugly about the shank of the drill D, so as to support it or brace it against lateral forces that may be applied thereto. The bottom of the bushing may be equipped with a knurled rib 22 by which it can be rotated relatively to body 15 to adjust its position with relation to the end of the drill. Thus if the drill is new and relatively long bushing 20 will be advanced from body 15 to leave only a relatively short portion of the end of the drill projecting unsupportedly therefrom. Successive grinding or sharpenings of the drill will shorten its length and by screwing the bushing back into body 15 the length of the drill that remains projecting may remain substantially a constant. On one side of the bushing 20 there is a vertical groove 23 into which a set screw 24 may be tightened to hold the bushing in adjusted position. 25 is a leather washer that is slipped onto the drill D and assumes a position against the bottom of the bushing. This washer prevents the lower end of the bushing coming in direct contact with the work which might scar or otherwise damage the work at the time that the drill completes its hole through the work.

Figure 2:
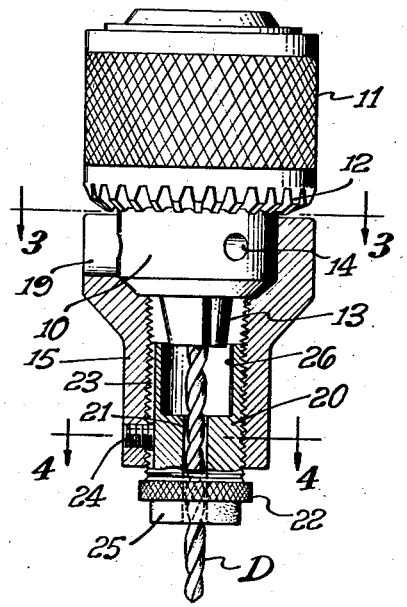
Fig. 2 is a view of the chuck on an enlarged scale the attachment being shown in vertical section taken substantially on the line 2—2 upon Fig. 1.
Figure 3:
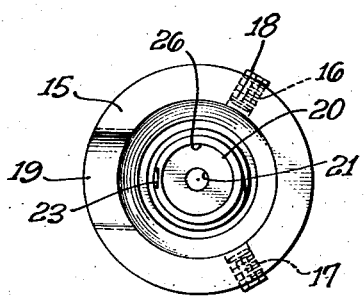
Fig. 3 is a top plan view of the attachment and may be regarded as having been taken substantially upon the line 3—3 upon Fig. 2.
Figure 4:
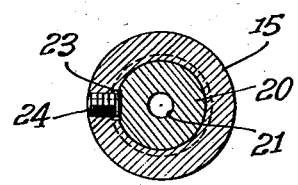
Fig. 4 is a horizontal section taken substantially upon the line 4—4 upon Fig. 2.

As will be noted from an inspection of Fig. 2, the upper end of the bushing is counterbored as indicated at 26 to receive the lower portions of the jaws 13 when the bushing 20 approaches its fully retracted position.

When the above-described attachment is applied to a chuck it rotates with the chuck and with the drill that is clamped between its jaws 13. The air driven or otherwise portable drill is manipulated in the conventional manner, but as only a short portion of the drill D is left unsupported beyond the lower end of the bushing 20 ordinary lateral strains applied to the drill are incapable of breaking this portion. As the drill dulls and is consecutively sharpened, set screw 24 can be loosened and bushing 20 adjusted into a more retracted position so as to leave substantially the same length of drill projecting therefrom.

As the attachment rotates with the chuck no bearing surface need be provided between the bushing 20 and the sides of the drill. Cuttings will normally be scattered by the drill during its rotation and the washer 25 not only serves to protect the work, but prevents or retards entry of cuttings between the drill and the bushing. Whenever it is desired to replace a drill the pinion key may be applied to the body of the chuck through opening 19 in the conventional manner and the collar 11 rotated to loosen the jaws 13. A replacing drill may be inserted through the bore 21 in the bushing and the collar again tightened. If the replacing drill is of a different size a differently-sized attachment may have to be applied to the chuck or a differently-sized bushing employed for this purpose. The attachment can be readily detached from the chuck by loosening the set screws 18.

It will be appreciated from the above-described construction that the attachment is extremely compact in form and may be very economically constructed and applied to the conventional Jacob's chuck without requiring modification or alteration thereof.

Various changes may be made in the details of construction without departing from the spirit and scope of the invention as defined by the appended claims.

I claim:

1. In combination with a chuck having a body with three circumferentially spaced recesses and a toothed collar on rotation of which the jaws of the chuck may be tightened and loosened, a tubular body telescopically arranged over the chuck body having two set screws adapted to enter two of said recesses and having an opening exposing the third recess to permit insertion of the collar-turning key for the chuck, and means on said body closely encircling a drill clamped by the chuck jaws for bracing the drill against lateral forces.

2. In combination with a chuck having a body with three circumferentially spaced recesses and a toothed collar on rotation of which the jaws of the chuck may be tightened and loosened, a tubular body telescopically arranged over the chuck body having two set screws adapted to enter two of said recesses and having an opening exposing the third recess to permit insertion of the collar-turning key for the chuck, and a bushing threaded into said body for advancement and retraction therein, said bushing fitting about a drill in the chuck jaws, and means for holding the bushing in adjusted position.

3. In combination with a chuck having a body with three circumferentially spaced recesses and a toothed collar on rotation of which the jaws of the chuck may be tightened and loosened, a tubular body telescopically arranged over the chuck body having two set screws adapted to enter two of said recesses and having an opening exposing the third recess to permit insertion of the collar-turning key for the chuck, and a bushing threaded into said body for advancement and retraction therein, said bushing fitting about a drill in the chuck jaws, and means for holding the bushing in adjusted position, said bushing being counterbored to receive the chuck jaws as the bushing approaches its fully retracted position.

4. An attachment for chucks comprising a tubular body adapted to be telescopically positioned over the body of a chuck, the upper end of said body being enlarged having two circumferentially spaced set screws receivable in circumferentially spaced recesses in the chuck body and an opening exposing a third recess in the chuck body, and a bushing threaded into said body having a bore therethrough adapted to closely receive a drill.

5. An attachment for chucks comprising a tubular body adapted to be telescopically positioned over the body of a chuck, the upper end of said body being enlarged having two circumferentially spaced set screws receivable in circumferentially spaced recesses in the chuck body and an opening exposing a third recess in the chuck body, and a bushing threaded into said body having a bore therethrough adapted to closely receive a drill, and a leather washer adapted to be positioned about the drill against the end of the bushing.

6. An attachment for chucks comprising a tubular body adapted to be telescopically positioned over the body of a chuck, the upper end of said body being enlarged having two circumferentially spaced set screws receivable in circumferentially spaced recesses in the chuck body and an opening exposing a third recess in the chuck body, and a bushing threaded into said body having a bore therethrough adapted to closely receive a drill, said bushing being counterbored to receive jaws of the chuck.

CHARLES P. STEWART.